(12) United States Patent
Ohtomo et al.

(10) Patent No.: US 11,150,346 B2
(45) Date of Patent: Oct. 19, 2021

(54) MEASURING METHOD AND LASER SCANNER

(71) Applicant: TOPCON Corporation, Tokyo-to (JP)

(72) Inventors: Fumio Ohtomo, Saitama (JP); Kaoru Kumagai, Tokyo-to (JP); Tetsuji Anai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 1113 days.

(21) Appl. No.: 15/667,668

(22) Filed: Aug. 3, 2017

(65) Prior Publication Data

US 2018/0052232 A1 Feb. 22, 2018

(30) Foreign Application Priority Data

Aug. 17, 2016 (JP) .............................. JP2016-160048

(51) Int. Cl.
*G01S 17/08* (2006.01)
*G01B 11/14* (2006.01)
*G01C 15/00* (2006.01)

(52) U.S. Cl.
CPC .............. *G01S 17/08* (2013.01); *G01B 11/14* (2013.01); *G01C 15/002* (2013.01)

(58) Field of Classification Search
CPC .......... G01S 17/00–17/08; G01S 17/89; G01S 17/894; G01C 15/002; G01C 3/00; G01C 15/008; G01C 15/00; G01C 1/02; G01C 1/04; G01C 15/004; G01C 15/02; G01C 15/006; G01C 9/00; G01C 21/16; G01C 19/5776; G01C 9/06; G01C 21/165; G01C 7/04; G01C 17/34; G01C 1/00; G01C 11/08; G01C 13/008; G01C 2009/066; G01C 21/12; G01C 17/02; G01C 7/06;
(Continued)

(56) References Cited

U.S. PATENT DOCUMENTS 5,988,862 A 11/1999 Kacyra et al.
9,251,624 B2 * 2/2016 Ito .......................... G06T 17/00
(Continued)

FOREIGN PATENT DOCUMENTS

| JP | 2000-509150 A | 7/2000 |
| WO | 2011/070927 A1 | 6/2011 |
| WO | 2014/080330 A2 | 5/2014 |

OTHER PUBLICATIONS

European communication dated Feb. 27, 2018 in corresponding European patent application No. 17186226.1.

*Primary Examiner* — Luke D Ratcliffe
(74) *Attorney, Agent, or Firm* — Nields, Lemack & Frame, LLC

(57) ABSTRACT

A measuring method, wherein point cloud data of a building is acquired by a laser scanner, wherein the laser scanner has an attitude detector for detecting a tilting with respect to a horizontality or a verticality, converts the point cloud data into a horizontal distance and a height or a difference of a height based on the tilting detected by the attitude detector, sets a height line at a predetermined height on a wall surface, averages a horizontal distance information of the point cloud data included in a predetermined width with the height line as a center in a height direction, further develops the horizontal distance information along the height line in a horizontal direction, and measures a horizontal cross section at the predetermined height.

13 Claims, 12 Drawing Sheets

(58) Field of Classification Search
CPC ........ G01C 5/00; G01C 11/00; G01C 11/025;
G01C 15/04; G01B 11/14; G01B 11/00;
G01B 11/22; G01B 11/24; G06T 17/10;
G06T 17/00; G06T 2200/08; G06T
2200/24; G06T 2210/56; G06T 7/344;
G06T 2207/10028; G06T 17/05
See application file for complete search history.

(56) References Cited

U.S. PATENT DOCUMENTS

| | | | |
|---|---|---|---|
| 10,520,307 B2 * | 12/2019 | Ohtomo | G01C 5/00 |
| 2008/0151216 A1 * | 6/2008 | Schiavi | G01C 15/002 |
| | | | 356/3 |
| 2012/0256916 A1 * | 10/2012 | Kitamura | G01B 11/24 |
| | | | 345/419 |
| 2013/0314688 A1 | 11/2013 | Likholyot | |

* cited by examiner

MEASURING METHOD AND LASER SCANNER

BACKGROUND OF THE INVENTION

The present invention relates to a measuring method in which measurement data of a building can be acquired easily, and a laser scanner which carries out the measuring method.

A drawing prepared by measuring a building is mainly a plan view by a measurement in a horizontal plane, and a measurement information of heights of pillars and walls is added to the plan view.

Conventionally, a laser distance measurement and a total station are used for this measurement, and especially in a measurement in a building, a plane view is prepared by measuring each angle in a space. This work requires skills, and it takes time for drawing.

Recently, although a three-dimensional data acquisition is also carried out by a laser scanning, in this case a necessary point cloud must be extracted from enormous amounts of point cloud data, and drawings must be prepared.

Therefore, there was a problem that a complicated work is required.

SUMMARY OF THE INVENTION

It is an object of the present invention to provide a measuring method and a laser scanner which enable a measurement of a building and acquisitions of a line information and a height information of a plane view by a simple laser scanning and with little point cloud data.

To attain the object as described above, in a measuring method according to the present invention, point cloud data of a building is acquired by a laser scanner, wherein the laser scanner has an attitude detector for detecting a tilting with respect to a horizontality or a verticality, converts the point cloud data into a horizontal distance and a height or a difference of a height based on the tilting detected by the attitude detector, sets a height line at a predetermined height on a wall surface, averages a horizontal distance information of the point cloud data included in a predetermined width with the height line as a center in a height direction, further develops the horizontal distance information along the height line in a horizontal direction, and measures a horizontal cross section at the predetermined height.

Further, in the measuring method according to the present invention, the laser scanner has an image pickup device, acquires an image including the point cloud data by the image pickup device, extracts vertical lines of the building from an acquired image, sections a horizontal distance measurement value developed in the horizontal direction by the vertical lines, performs a straight line fitting to a change in the horizontal distance measurement value developed between the vertical lines, and acquires data of a straight line.

Further, in the measuring method according to the present invention, a plurality of the height lines at different heights are set, and a plurality of horizontal cross sections at different heights are measured.

Further, in the measuring method according to the present invention, a horizontal plane is recognized from the acquired image, a measurement region is set in the horizontal plane, heights of the point cloud data belonging to the measurement region are averaged, and a height of the horizontal plane is measured.

Further, in the measuring method according to the present invention, the point cloud data are acquired from a plurality of installation points so as to overlap each other, partial horizontal cross sections are measured respectively based on each of the point cloud data, the partial horizontal cross-sectional views acquired based on measurement results are overlapped and matched, and the partial horizontal cross sections are connected.

Further, in the measuring method according to the present invention, the heights of the horizontal plane are measured from the each of the point cloud data regarding each of the installation points of the plurality of installation points, and the measured heights are matched in the height direction, and the partial horizontal cross sections are connected.

Further, a laser scanner according to the present invention comprises a light emitting element for emitting a distance measuring light, a distance measuring light projecting unit for projecting the distance measuring light, a light receiving unit for receiving a reflected distance measuring light and a photodetector for receiving the reflected distance measuring light and producing a light receiving signal, and comprising a distance measuring unit for performing a distance measurement of an object to be measured based on the light receiving signal from the photodetector, a control unit for controlling a distance measuring operation, an optical axis deflecting unit provided on an optical axis of the distance measuring light projecting unit and an optical axis of the light receiving unit and for controlling a deflection of the optical axes, a projecting direction detector for detecting deflection angles of the optical axes and an attitude detector for detecting a horizontality or a verticality, wherein the control unit is configured to control the optical axis deflecting unit, to scan the distance measuring light in a predetermined range, to acquire point cloud data with a distance measurement information, the deflection angles detected by the projecting direction detector, and a horizontal distance and a height information based on a detection result of the attitude detector, to set a height line at a predetermined height on a wall surface, to add and average the horizontal distance information included in a predetermined width with the height line as a center in a height direction, further to develop the horizontal distance information along the height line in a horizontal direction, and to measure a horizontal cross section at the predetermined height.

Furthermore, the laser scanner according to the present invention comprises an image pickup device, wherein an image including the point cloud data is acquired by the image pickup device, and wherein the control unit extracts vertical lines of a building from an acquired image, sections the horizontal distance information developed in the horizontal direction by the vertical lines, performs a straight line fitting to a change in the horizontal distance information developed between the vertical lines, and acquires data of a straight line.

According to the present invention, in the measuring method, point cloud data of a building is acquired by a laser scanner, wherein the laser scanner has an attitude detector for detecting a tilting with respect to a horizontality or a verticality, converts the point cloud data into a horizontal distance and a height or a difference of a height based on the tilting detected by the attitude detector, sets a height line at a predetermined height on a wall surface, averages a horizontal distance information of the point cloud data included in a predetermined width with the height line as a center in a height direction, further develops the horizontal distance information along the height line in a horizontal direction, and measures a horizontal cross section at the predetermined height. As a result, a horizontal cross section can be measured with little point cloud data, and a measurement time can be shortened.

Further, according to the present invention, a laser scanner comprises a light emitting element for emitting a distance measuring light, a distance measuring light projecting unit for projecting the distance measuring light, a light receiving unit for receiving a reflected distance measuring light and a photodetector for receiving the reflected distance measuring light and producing a light receiving signal, and comprising a distance measuring unit for performing a distance measurement of an object to be measured based on the light receiving signal from the photodetector, a control unit for controlling a distance measuring operation, an optical axis deflecting unit provided on an optical axis of the distance measuring light projecting unit and an optical axis of the light receiving unit and for controlling a deflection of the optical axes, a projecting direction detector for detecting deflection angles of the optical axes and an attitude detector for detecting a horizontality or a verticality, wherein the control unit is configured to control the optical axis deflecting unit, to scan the distance measuring light in a predetermined range, to acquire point cloud data with a distance measurement information, the deflection angles detected by the projecting direction detector, and a horizontal distance and a height information based on a detection result of the attitude detector, to set a height line at a predetermined height on a wall surface, to add and average the horizontal distance information included in a predetermined width with the height line as a center in a height direction, further to develop the horizontal distance information along the height line in a horizontal direction, and to measure a horizontal cross section at the predetermined height. As a result, the horizontal cross section can be measured with the little point cloud data, and the measurement time can be shortened.

DETAILED DESCRIPTION OF THE PREFERRED EMBODIMENT

A description will be given below on an embodiment of the present invention by referring to the attached drawings.

First, in FIG. 1, a description will be given on general features of a laser scanner according to the present embodiment.

Figure 1:
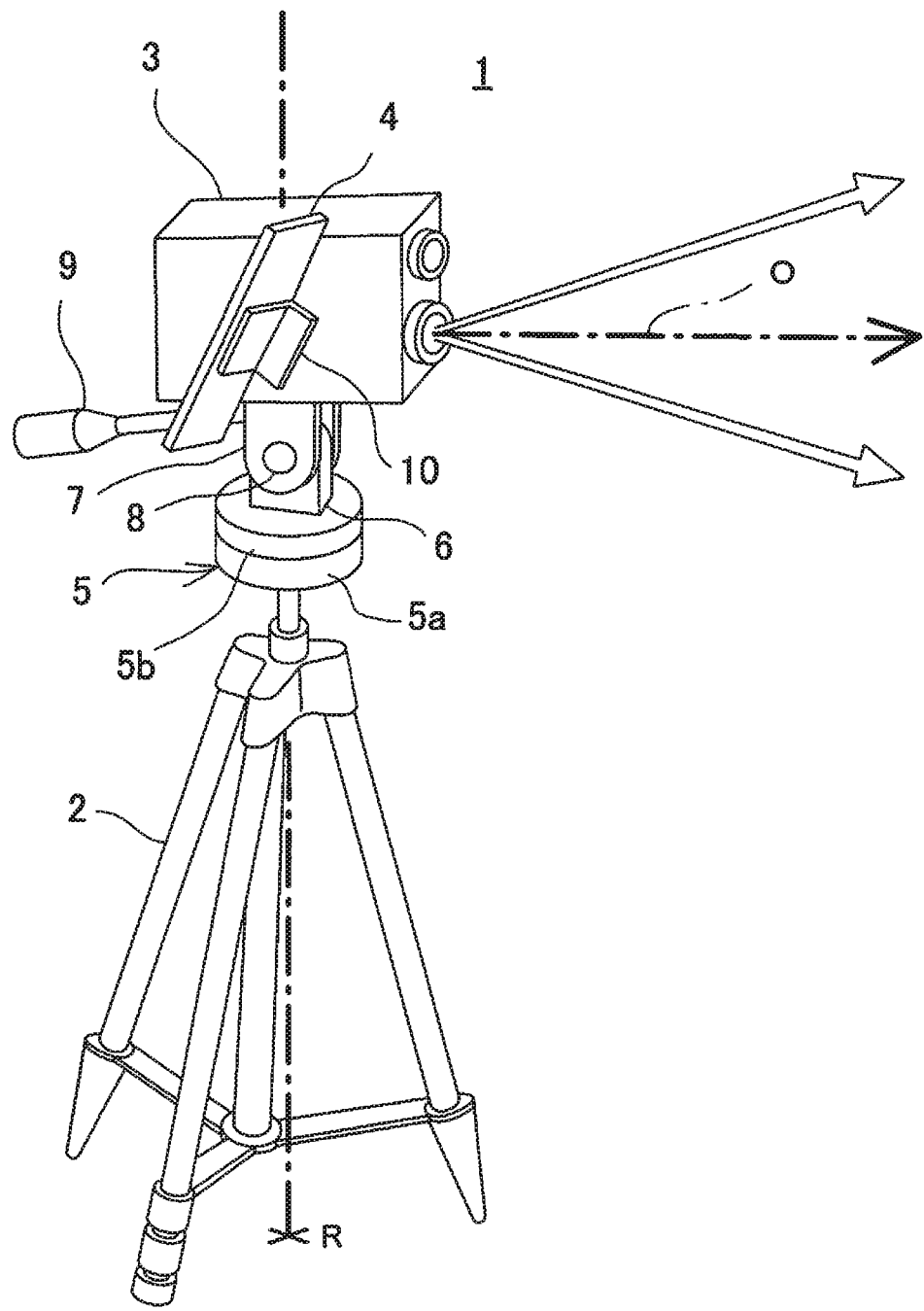
FIG. 1 is one external view of a laser scanner embodied in the present invention.

In FIG. 1, reference numeral 1 denotes a laser scanner, and reference numeral O denotes a distance measuring optical axis O when a distance measuring optical axis is not deflected. The laser scanner 1 is installed at an installation point (a reference point) R via an installation base. It is to be noted that a tripod 2 is shown as the installation base in the drawing. The laser scanner 1 can perform a measurement according to a prism measurement mode in which an object to be measured is a prism and the measurement according to a non-prism measurement mode without using the prism in a case where the object to be measured is a structure, or the like.

The laser scanner 1 primarily comprises a laser scanner main unit 3, an operation device 4, and a mount base 5. The mount base 5 is mounted on an upper end of the tripod 2, and the laser scanner 1 is mounted on the mount base 5.

The mount base 5 has a fixing seat 5a and a rotating seat 5b capable of rotating in a lateral direction (a horizontal direction in FIG. 1) with respect to the fixing seat 5a. A lower supporting piece 6 is protruded on an upper surface of the rotating seat 5b, and an upper supporting piece 7 is connected to the lower supporting piece 6 via a longitudinal rotation shaft 8 rotatably in a longitudinal direction (a vertical direction in FIG. 1). It is to be noted that an angle detector which detects a rotation angle of the rotating seat 5b with respect to the fixing seat 5a may be provided.

The laser scanner main unit 3 is fixed to the upper supporting piece 7. Therefore, the laser scanner main unit 3 can rotate in the horizontal direction and the vertical direction with respect to the tripod 2.

A lever 9 extending in a direction orthogonal to the longitudinal rotation shaft 8 is provided on the upper supporting piece 7. By moving the lever 9 up and down, the laser scanner main unit 3 rotates in the longitudinal direction around the longitudinal rotation shaft 8 as a center. Further, the lever 9 is screwed into the upper supporting piece 7. By rotating the lever 9 around an axis of the lever 9 as the center and tightening the lever 9, a rotation between the lower supporting piece 6 and the upper supporting piece 7 is restricted, and by loosening the lever 9, the upper supporting piece 7 can freely rotate. Therefore, the laser scanner main unit 3 can be fixed at an arbitrary angle.

The laser scanner main unit 3 has a built-in distance measuring unit (to be described later) and a built-in attitude detector (to be described later). The distance measuring unit projects a distance measuring light toward an object to be measured or a measurement area, receives a reflected distance measuring light and performs a distance measurement. Further, the attitude detector can detect an attitude of the laser scanner main unit 3 to the vertical (or the horizontal) with high accuracy.

The operation device 4 has a communication function to perform a communication to and from the laser scanner main unit 3 via a manner as required such as a wired manner or a non-wired manner. Further, the operation device 4 has a display unit 4a and an operation unit 4b (see FIG. 2) and can operate the laser scanner 1 by an operation from the operation unit 4b. Further, images, measuring conditions, measurement results, or the like are transmitted from the laser scanner main unit 3 to the operation device 4, and the images, the measuring conditions, the measurement results, or the like are stored in the operation device 4 or are displayed on the display unit 4a.

It is to be noted that the display unit 4a may be designed as a touch panel, and the display unit 4a may be commonly used as the operation unit 4b. Further, the operation device 4 is designed as a smart phone, for instance, and may be attached to or detached from the laser scanner main unit 3 by an attachment 10.

Figure 2:
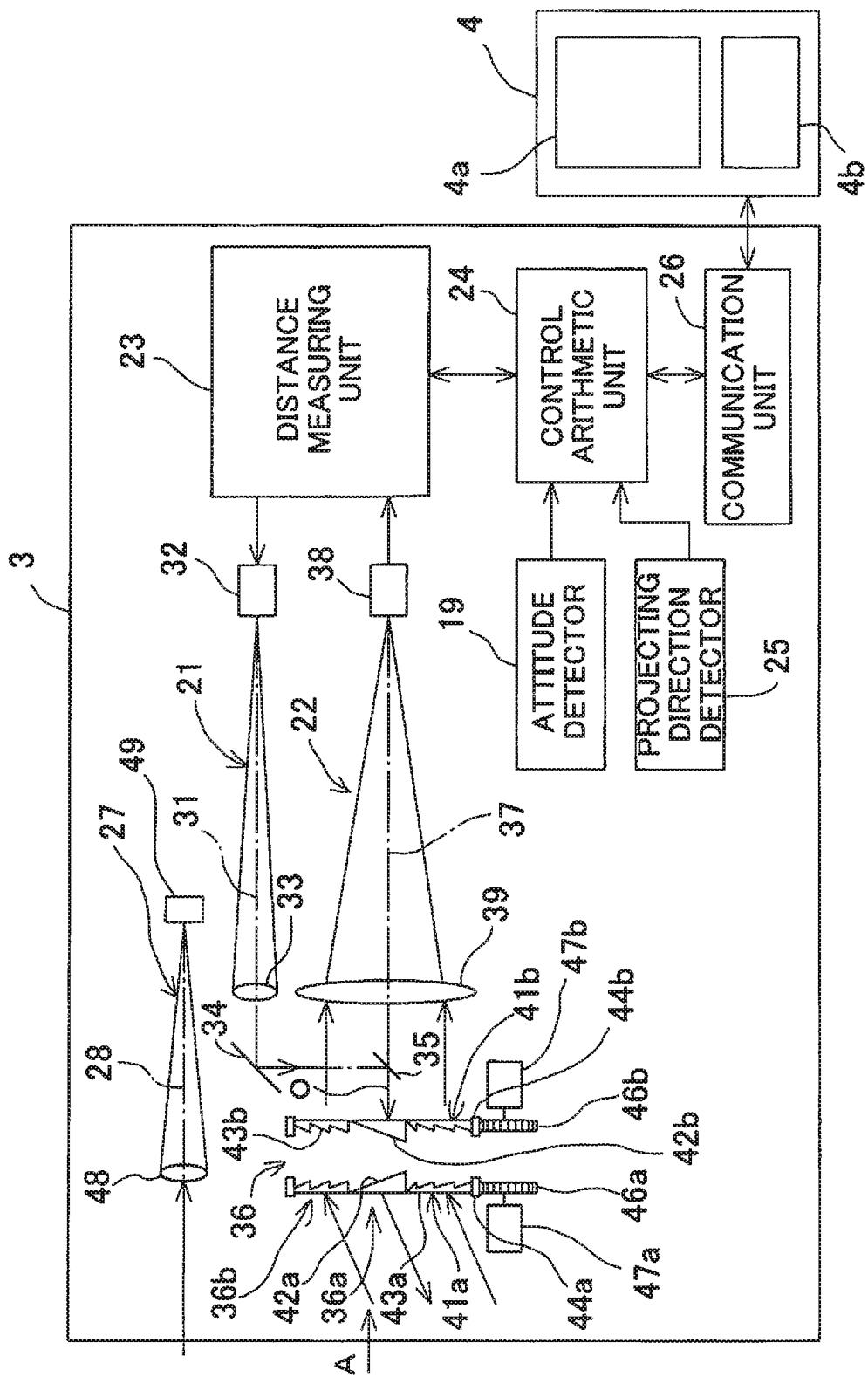
FIG. 2 is a schematical block diagram of the laser scanner.
Figure 3:
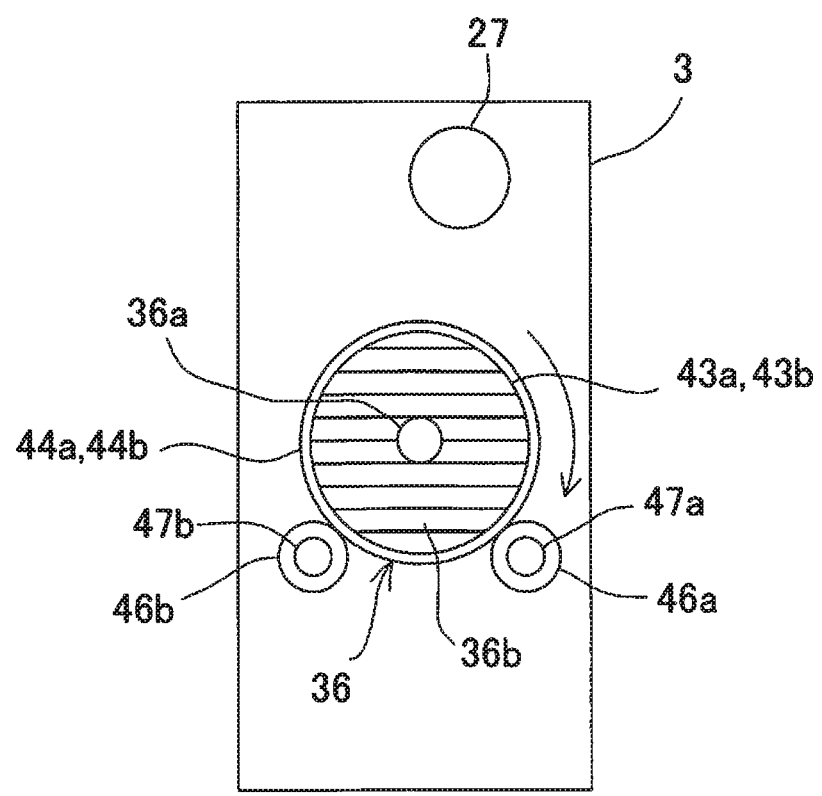
FIG. 3 is a drawing along a line A in FIG. 2.

Next, a description will be given on the laser scanner main unit 3 by referring to FIG. 2 and FIG. 3.

The laser scanner main unit 3 has an attitude detector 19, a distance measuring light projecting unit 21, a light receiving unit 22, a distance measuring unit 23, a control arithmetic unit 24, a projecting direction detector 25, a communication unit 26 and an image pickup device 27.

The attitude detector 19 detects an attitude (i.e., a tilt angle or a tilting direction of the distance measuring optical axis O) of the laser scanner main unit 3 with respect to the horizontal (or the vertical). A detection result is input to the control arithmetic unit 24.

The distance measuring light projecting unit 21 projects the distance measuring light. The distance measuring light projecting unit 21 has a projection optical axis 31. A light emitting element 32, e.g., a laser diode (LD) is provided on the projection optical axis 31, and a projecting lens 33 is provided on the projection optical axis 31.

Further, a first reflecting mirror 34 as a deflecting optical component is provided on the projection optical axis 31. Further, a second reflecting mirror 35 as a deflecting optical component is provided on a light receiving optical axis 37 (to be described later) in such a manner that a second reflecting mirror 35 confronts the first reflecting mirror 34.

The first reflecting mirror 34 and the second reflecting mirror 35 make the projection optical axis 31 coincide with the distance measuring optical axis O. An optical axis deflecting unit 36 is disposed on the distance measuring optical axis O. The optical axis deflecting unit 36 deflects the distance measuring light passing through the optical axis deflecting unit 36 and irradiates the distance measuring light to a predetermined point.

The light receiving unit 22 receives the reflected distance measuring light from the object to be measured. The light receiving unit 22 has a light receiving optical axis 37 parallel to the projection optical axis 31, and the light receiving optical axis 37 also becomes common as the distance measuring optical axis O.

A photodetector 38, for instance, a photodiode (PD) or an avalanche photodiode (APD) is provided on the light receiving optical axis 37, and further an image forming lens 39 is arranged on an image side of the optical axis deflecting unit 36. The image forming lens 39 focuses the reflected distance measuring light passed through the optical axis deflecting unit 36 on the photodetector 38. The photodetector 38 receives the reflected distance measuring light, and produces a light receiving signal. The light receiving signal is input to the distance measuring unit 23.

A detailed description will be given on the optical axis deflecting unit 36 by referring to FIG. 2 and FIG. 3.

A pair of optical prisms 41a and 41b are arranged in the optical axis deflecting unit 36. The optical prisms 41a and 41b are designed in a disk-like shape respectively, disposed perpendicularly crossing the light receiving optical axis 37, overlapped on each other and arranged in parallel to each other. As for the optical prisms 41a and 41b, a Fresnel prism is preferably used respectively in order to reduce a size of the instrument.

A central part of the optical axis deflecting unit 36 is designed as a distance measuring light deflecting unit 36a which the distance measuring light passes through, and a portion of the optical axis deflecting unit 36 except the central part is designed as a reflected distance measuring light deflecting unit 36b.

The Fresnel prisms used as the optical prisms 41a and 41b are made up by prism elements 42a and 42b and a large number of prism elements 43a and 43b which are formed in parallel respectively, and have a plate shape. The optical prisms 41a and 41b, each of the prism elements 42a and 42b and the prism elements 43a and 43b have the same optical characteristics, respectively.

The prism elements 42a and 42b constitute the distance measuring light deflecting unit 36a, and the prism elements 43a and 43b constitute the reflected distance measuring light deflecting unit 36b.

The Fresnel prisms may be manufactured from an optical glass or the Fresnel prism may be molded by using an optical plastic material. By molding the Fresnel prism by using the optical plastic material, a low cost Fresnel prism can be manufactured.

The optical prisms 41a and 41b are arranged in such a manner that the optical prisms 41a and 41b can individually rotate with the light receiving optical axis 37 as the center. By independently controlling rotating directions, rotation amounts and rotating speeds, the optical prisms 41a and 41b deflect a distance measuring optical axis of the distance measuring light as emitted in an arbitrary direction, and deflect a light receiving optical axis of the reflected distance measuring light as received in parallel to the distance measuring optical axis.

An outer shape of each of the optical prisms 41a and 41b is designed as a circle shape with the light receiving optical axis 37 as the center. Taking an expansion of the reflected distance measuring light into consideration, diameters of the optical prisms 41a and 41b are set so that a sufficient light amount can be obtained.

A ring gear 44a is fitted with an outer periphery of the optical prism 41a, and a ring gear 44b is fitted with an outer periphery of the optical prism 41b.

A driving gear 46a meshes with the ring gear 44a, and the driving gear 46a is fixed to an output shaft of a motor 47a. A driving gear 46b meshes with the ring gear 44b, and the driving gear 46b is fixed to an output shaft of the motor 47b. The motors 47a and 47b are electrically connected to the control arithmetic unit 24.

As the motors 47a and 47b, a motor which can detect a rotation angle or a motor which rotates corresponding to a driving input value, e.g., a pulse motor is used. Alternatively, by using a rotation angle detector which detects a rotation amount (the rotation angle) of the motor, e.g., an encoder (not shown) or the like, the rotation amount of the motor may be detected. The rotation amounts of the motors 47a and 47b are detected respectively, and the motors 47a and 47b are individually controlled by the control arithmetic unit 24.

The driving gears 46a and 46b and the motors 47a and 47b are provided at positions not interfering with the distance measuring light projecting unit 21, for instance, on a lower side of the ring gears 44a and 44b.

The projecting lens 33, the distance measuring light deflecting unit 36a or the like make up a light projecting optical system, and the reflected distance measuring light deflecting unit 36b, the image forming lens 39 or the like make up a light receiving optical system.

The distance measuring unit 23 controls the light emitting element 32, and make the light emitting element 32 to emit a laser beam as the distance measuring light. The distance measuring optical axis O is deflected by the optical axis deflecting unit 36 (the distance measuring light deflecting unit 36a) so that the distance measuring optical axis O is directed toward a measuring point.

The reflected distance measuring light reflected from the object to be measured enters through the optical prisms 41a and 41b (the reflected distance measuring light deflecting unit 36b) and the image forming lens 39, and is received by the photodetector 38. The photodetector 38 spends a light receiving signal to the distance measuring unit 23, and the distance measuring unit 23 performs a distance measurement of a measuring point (a point irradiated with the distance measuring light) based on a light receiving signal from the photodetector 38.

The control arithmetic unit 24 is constituted of an input/output control unit, an arithmetic unit (a CPU), a storage unit, and the like. In the storage unit, various types of programs are stored. These programs include: a distance measuring program for controlling a distance measuring operation, a control program for controlling drivings of the motors 47a and 47b, a scanning control program for setting a scanning pattern, a point cloud data density, or the like, a communication program for performing image and data communication to and from the operation device 4, a directional angle calculating program for calculating directional angles (a horizontal angle and a vertical angle) of the distance measuring optical axis O based on calculating results in a projecting direction from the projecting direction detector 25 and on a lateral rotation angle detection result from the mount base 5, or the like. Further, in the storage unit, the measurement results, e.g., distance measuring data, image data, or the like are stored.

The projecting direction detector 25 counts driving pulses input to the motors 47a and 47b and detects rotation angles of the motors 47a and 47b. Alternatively, the projecting direction detector 25 detects the rotation angles of the motors 47a and 47b based on a signal from an encoder. Further, the projecting direction detector 25 calculates rotational positions of the optical prisms 41a and 41b based on the rotation angles of the motors 47a and 47b and calculates a deflection angle and a projecting direction of the distance measuring light with respect to the distance measuring optical axis O based on refractive indexes and a rotational position of the distance measuring light deflecting unit 36a (i.e., the prism elements 42a and 42b), and the calculating results are input to the control arithmetic unit 24.

The communication unit 26 receives a command regarding the measurement sent from the operation device 4, inputs the command to the control arithmetic unit 24 and sends measurement data and an acquired image to the operation device 4.

Next, the image pickup device 27 is an image acquiring means for acquiring an image including a measurement range and has an image pickup optical axis 28. The image pickup optical axis 28 is set so as to run parallel to the distance measuring optical axis O in a state where the optical axis deflecting unit 36 does not deflect the distance measuring optical axis O. An image forming lens 48 and an image pickup element 49 are provided on the image pickup optical axis 28.

A field angle of the image pickup device 27 is set so as to be equivalent to or somewhat larger than a range where an optical axis can be deflected by the optical axis deflecting unit 36. The field angle of the image pickup device 27 is set to 50, for instance.

Further, the image pickup element 49 is a CCD or a CMOS sensor which is an aggregate of pixels, and it is so arranged that a position of each pixel on an image element can be specified. For example, a position of each pixel is specified by a coordinate system with an optical axis of each camera as an origin point.

A description will be given on a deflecting action by the optical axis deflecting unit 36 by referring to FIG. 4A, FIG. 4B, and FIG. 4C.

Figure 4A:
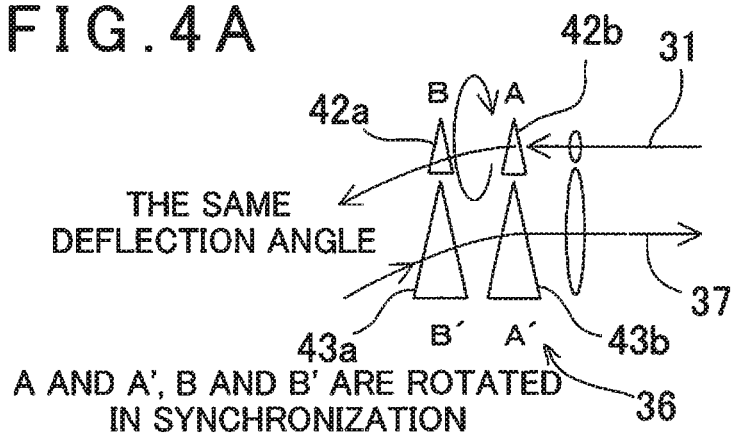
FIGS. 4A, 4B and 4C are drawings to explain an operation of an optical axis deflecting unit in the laser scanner.

It is to be noted that, in order to simplify an explanation, in FIG. 4A the optical prisms 41a and 41b are shown by separating the prism elements 42a and 42b and the prism elements 43a and 43b. Further, the prism elements 42a and 42b and the prism elements 43a and 43b as shown in FIG. 4A are in a state where a maximum deflection angle can be obtained. Further, the minimum deflection angle is a position where either one of the optical prism 41a and 41b is rotated 180°, the deflection angle becomes 0°, and an optical axis of a laser beam as projected coincides with the distance measuring optical axis O.

The distance measuring light is emitted from the light emitting element 32, and the distance measuring light is turned to a parallel luminous flux by the projecting lens 33, and projected toward an object to be measured or a measurement target area through the distance measuring light deflecting unit 36a (the prism elements 42a and 42b). Here, by passing through the distance measuring light deflecting unit 36a, the distance measuring light is deflected in a direction as required by the prism elements 42a and 42b and is projected.

The reflected distance measuring light as reflected by the object to be measured or the measurement target area is entered through the reflected distance measuring light deflecting unit 36b and is focused on the photodetector 38 by the image forming lens 39.

When the reflected distance measuring light passes through the reflected distance measuring light deflecting unit 36b, an optical axis of the reflected distance measuring light is deflected by the prisms 43a and 43b so as to coincide with the light receiving optical axis 37 (FIG. 4A).

By combining a rotation position of the optical prism 41a with a rotation position of the optical prism 41b, a deflecting direction and a deflection angle of the distance measuring light to be projected can be arbitrarily changed.

Further, in a state where a positional relation between the optical prism 41a and the optical prism 41b is fixed (in a state where a deflection angle obtained by the optical prism 41a and the optical prism 41b is fixed), the optical prism 41a and the optical prism 41b are integrally rotated by the motors 47a and 47b. A locus drawn by the distance measuring light passing through the distance measuring light deflecting unit 36a becomes a circle with the distance measuring optical axis O as the center.

Therefore, when the optical axis deflecting unit 36 is rotated while emitting a laser beam from the light emitting element 32, the distance measuring light can be scanned by a circular locus.

It is to be noted that it is needless to say that the reflected distance measuring light deflecting unit 36b rotates integrally with the distance measuring light deflecting unit 36a.

Figure 4B:
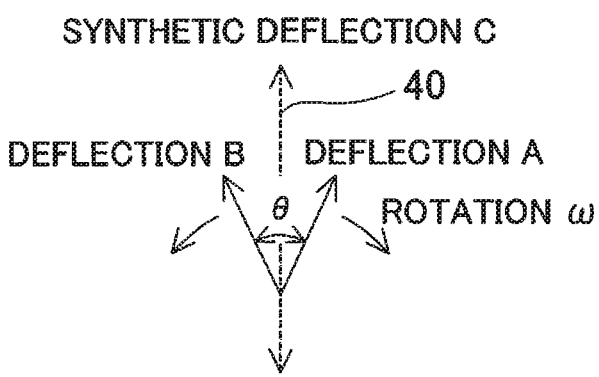

Next, FIG. 4B shows a case where the optical prism 41a and the optical prism 41b are relatively rotated. Assuming that a deflecting direction of the optical axis as deflected by the optical prism 41a is a deflection "A" and a deflecting direction of the optical axis as deflected by the optical prism 41b is a deflection "B", the deflection of the optical axes by the optical prisms 41a and 41b becomes a synthetic deflection "C" as an angle difference θ between the optical prisms 41a and 41b.

Therefore, in a case where the optical prism 41a and the optical prism 41b are synchronized in an opposite direction and reciprocally rotated at an equal angle and at a constant speed, the distance measuring light passed through the optical prisms 41a and 41b is scanned linearly. Therefore, when the optical prism 41a and the optical prism 41b are reciprocally rotated at the equal angle and at the constant speed in the opposite direction, as shown in FIG. 4B, the distance measuring light can be reciprocally scanned in a direction of the synthetic deflection C by a linear locus 40.

Figure 4C:
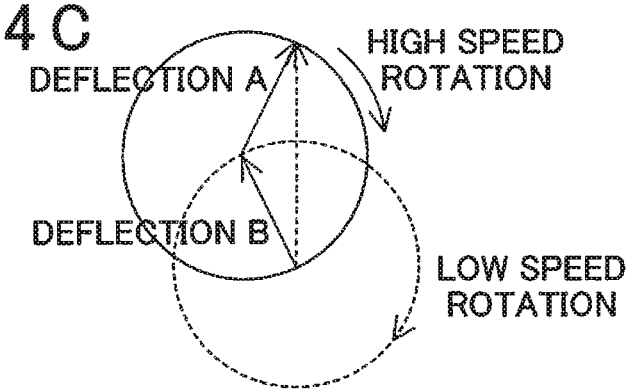

Further, as shown in FIG. 4C, when the optical prism 41b is rotated at a rotating speed lower than a rotating speed of the optical prism 41a, since the distance measuring light is rotated while the angle difference θ gradually increases, a scanning locus of the distance measuring light becomes a spiral form.

Furthermore, by individually controlling the rotating directions and the rotating speeds of the optical prism 41a and the optical prism 41b, various scanning states, e.g., a state where the scanning locus of the distance measuring light is made in an irradiation direction with the distance measuring optical axis O as the center (scanning in a radial direction), or in the horizontal direction, or in the vertical direction, or the like can be obtained.

As a mode of measurement, by performing a distance measurement by fixing the optical axis deflecting unit 36 (the optical prisms 41a and 41b) per each deflection angle as required, the distance measurement can be performed with respect to a specific measurement point. Further, by performing the distance measurement while changing the deflection angles of the optical axis deflecting unit 36, that is, by performing the distance measurement while scanning the distance measuring light, the distance measurement data (scanning data) can be acquired.

Further, a projection directional angle of each distance measuring light can be detected by the rotation angles of the motors 47a and 47b, and by associating the projection directional angle with the distance measurement data, three-dimensional distance measurement data can be acquired.

Therefore, the laser scanner 1 can function as a laser scanner which acquires three-dimensional point cloud data.

Next, a detailed description will be given on the attitude detector 19 by referring to FIG. 5 and FIG. 6. It is to be noted that in the description as given below, the top and bottom corresponds to the top and bottom in the figure, and the left and right corresponds to the left and right in the figure.

An inner frame 53 designed in a rectangular frame shape is provided inside an outer frame 51 designed in a rectangular frame shape, and a tilt detecting unit 56 is provided inside the inner frame 53.

The longitudinal shafts 54 and 54 are protruded from an upper surface and a lower surface of the inner frame 53. The longitudinal shafts 54 and 54 are rotatably fitted in bearings 52 and 52 provided on the outer frame 51. The longitudinal shafts 54 and 54 have a longitudinal axis, and the inner frame 53 can rotate with the longitudinal shafts 54 and 54 as the center over 360° in a left and right direction.

The tilt detecting unit 56 is supported by a lateral shaft 55, and both end portions of the lateral shaft 55 are rotatably fitted to bearings 57 and 57 provided to the inner frame 53. The lateral shaft 55 has a lateral axis which orthogonal crosses the longitudinal axis, and the tilt detecting unit 56 can rotate with the lateral shaft 55 as the center over 360° in an up and down direction.

Thus, the tilt detecting unit 56 is rotatably supported with respect to the outer frame 51 via a gimbal mechanism which can rotate over 360° in two axial directions.

A first gear 58 is attached to one of the longitudinal shafts 54 and 54, e.g., on the longitudinal shaft 54 of a lower side, and the first gear 58 meshes with a first driving gear 59. Further, a first motor 61 is provided on a lower surface of the outer frame 51, and the first driving gear 59 is attached to an output shaft of the first motor 61.

A first encoder 62 is attached on the other of the longitudinal shafts 54 and 54. The first encoder 62 is adapted to detect a rotation angle of the inner frame 53 with respect to the outer frame 51 in the left and right direction.

A second gear 63 is attached to one end portion of the lateral shaft 55, and a second driving gear 64 meshes with the second gear 63. Further, a second motor 65 is attached on a side surface (a left side surface in the figure) of the inner frame 53, and the second driving gear 64 is attached to an output shaft of the second motor 65.

A second encoder 66 is attached on the other end portion of the lateral shaft 55, and the second encoder 66 is adapted to detect a rotation angle of the tilt detecting unit 56 with respect to the inner frame 53 in the up and down direction.

The first encoder 62 and the second encoder 66 are electrically connected to an arithmetic processing unit 68.

The tilt detecting unit 56 has a first tilt sensor 71 and a second tilt sensor 72, and the first tilt sensor 71 and the second tilt sensor 72 are electrically connected to the arithmetic processing unit 68.

A further description will be given on the attitude detector 19 by referring to FIG. 6.

The attitude detector 19 comprises the first encoder 62, the second encoder 66, the first tilt sensor 71, the second tilt sensor 72, the arithmetic processing unit 68, the first motor 61, and the second motor 65. Further, the attitude detector 19 comprises a storage unit 73 and an input/output control unit 74.

The storage unit 73 stores programs such as a calculation program for an attitude detection, or the like and data such as calculation data, or the like.

The input/output control unit 74 drives the first motor 61 and the second motor 65 based on a control command output from the arithmetic processing unit 68, and outputs a tilt detection result calculated by the arithmetic processing unit 68 as a detection signal.

The first tilt sensor 71 is for detecting the horizontality with high accuracy, e.g., a tilt sensor, and is a tilt detector which allows a detection light to enter a horizontal liquid surface and detects a horizontality according to a change in a reflection angle of a reflection light, or is a bubble tube which detects a tilt based on a positional change in a sealed air bubble. Further, the second tilt sensor 72 is for detecting a change in a tilt with high responsiveness, and is, e.g., an acceleration sensor.

It is to be noted that both the first tilt sensor 71 and the second tilt sensor 72 can individually detect tilts in two axis directions, i.e., a rotating direction (a tilting direction) as detected by the first encoder 62 and a rotating direction (a tilting direction) as detected by the second encoder 66.

The arithmetic processing unit 68 calculates a tilt angle and a tilting direction based on the detection results from the first tilt sensor 71 and the second tilt sensor 72. Further, the arithmetic processing unit 68 calculates a tilt angle of the laser scanner main unit 3 with respect to the verticality (or the horizontality) based on a rotation angle of the first encoder 62 and a rotation angle of the second encoder 66 corresponding to the tilt angle and the tilting direction.

It is to be noted that the attitude detector 19 is set in such a manner that the first tilt sensor 71 detects the horizontality in a case where the outer frame 51 is horizontally installed, and further, is set in such a manner that both an output of the first encoder 62 and an output of the second encoder 66 indicate a reference position (a rotation angle at 0°).

A description will be given below on an action of the attitude detector 19.

First, a description will be given on a case where a tilting is detected with high accuracy.

As a case where a tilting is detected with high accuracy, for instance, a case where the attitude detector 19 is installed on such an installation type laser scanner as shown in FIG. 1.

When the attitude detector 19 tilts, the first tilt sensor 71 outputs a signal corresponding to a tilting.

The arithmetic processing unit 68 calculates a tilt angle and a tilting direction based on the signal from the first tilt sensor 71 and further calculates rotation amounts of the first motor 61 and the second motor 65 in order to make the tilt angle and the tilting direction 0 based on a calculation result. The arithmetic processing unit 68 outputs a driving command for driving the first motor 61 and the second motor 65 by the rotation amounts via the input/output control unit 74.

According to the driving command from the arithmetic processing unit 68, the first motor 61 and the second motor 65 are driven so as to be tilted oppositely to the calculated tilt angle and the tilting direction. Rotation amounts (the rotation angles) of the motors are detected by the first encoder 62 and the second encoder 66 respectively, and the drivings of the first motor 61 and the second motor 65 are stopped when the rotation angles reach the calculation results.

In this state, the tilt detecting unit 56 is controlled to the horizontal under a condition where the outer frame 51 is tilted.

Therefore, in order to make the tilt detecting unit 56 horizontal, the tilt angle and the tilting direction, by which the inner frame 53 and the tilt detecting unit 56 are tilted by the first motor 61 and the second motor 65, are obtained based on the rotation angles as detected by the first encoder 62 and the second encoder 66.

The arithmetic processing unit 68 calculates the tilt angle and the tilting direction of the attitude detector 19 based on the detection results of the first encoder 62 and the second encoder 66 when the first tilt sensor 71 detected the horizontal. The calculation result indicates the attitude of the attitude detector 19 after the attitude detector 19 is tilted.

The arithmetic processing unit 68 outputs the calculated tilt angle and the tilting direction to an outside via the input/output control unit 74 as a detection signal of the attitude detector 19.

Figure 5:
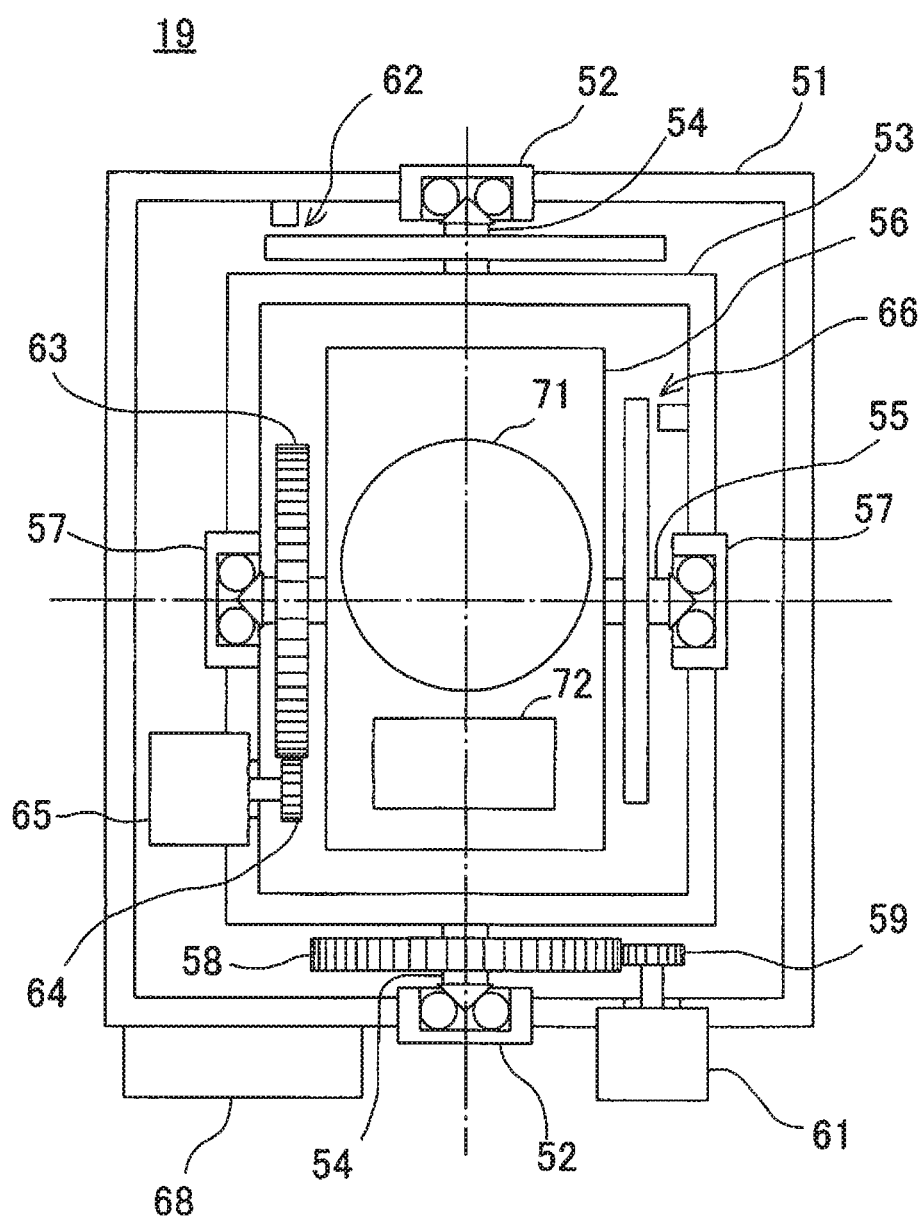
FIG. 5 is a plan view of an attitude detector.
Figure 6:
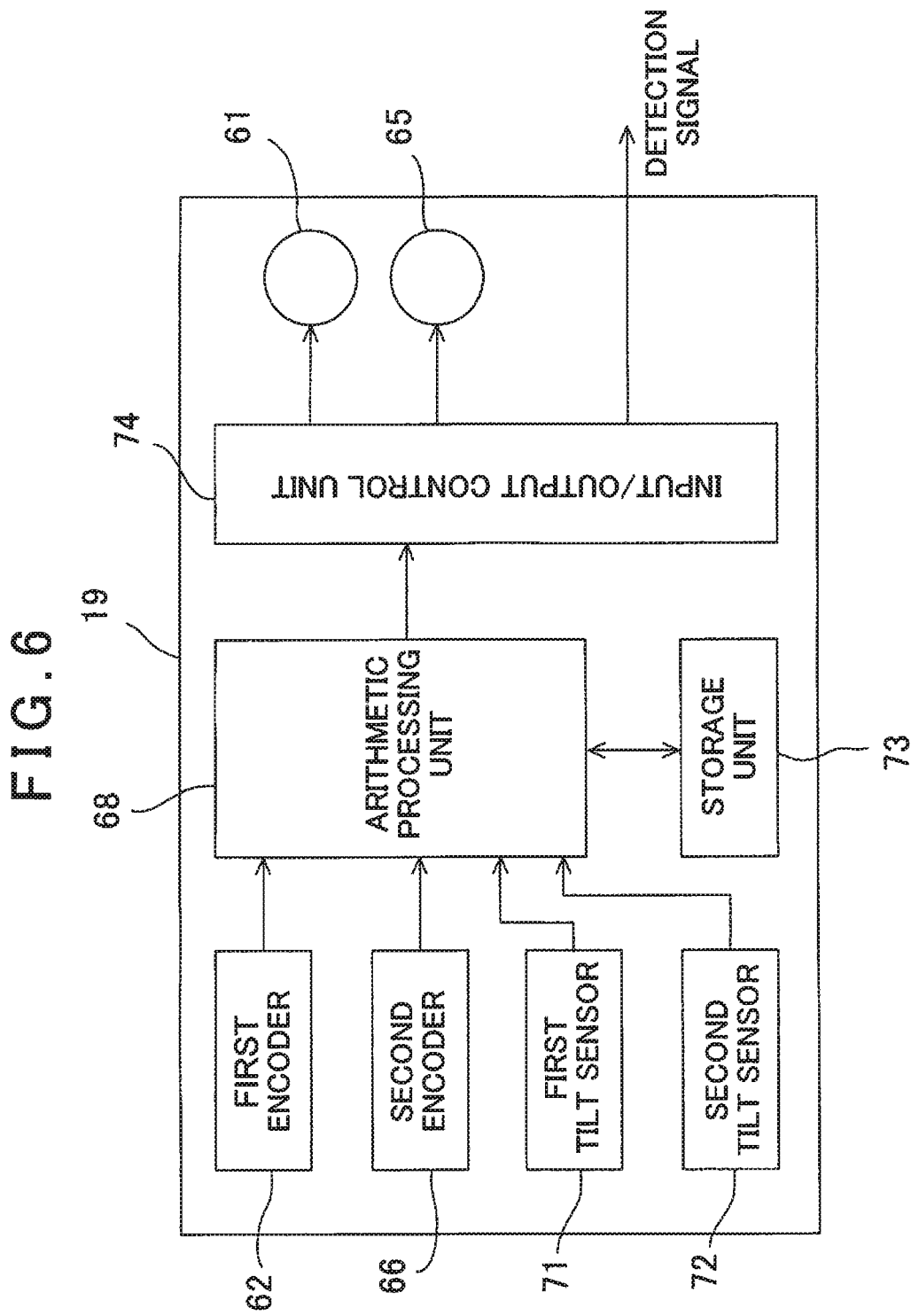
FIG. 6 is a schematical block diagram of the attitude detector.

In the attitude detector 19, as a structure shown in FIG. 5, there is nothing which restricts rotations of the tilt detecting unit 56 and the inner frame 53. Therefore, the tilt detecting unit 56 and the inner frame 53 can both rotate by 360° or more. That is, the attitude detection in all directions can be performed no matter what attitude the attitude detector 19 takes (for instance, even when the attitude 19 is upside down).

In the attitude detection, in a case where high responsiveness is required, although the attitude detection and an attitude control are performed based on the detection result of the second tilt sensor 72, the second tilt sensor 72 has poorer detection accuracy than the first tilt sensor 71 in general.

In the present embodiment, by comprising the first tilt sensor 71 with high accuracy and the second tilt sensor 72 with high responsiveness, the attitude control is performed based on the detection results of the second tilt sensor 72, and the attitude detection with high accuracy can be performed by the first tilt sensor 71.

That is, the first motor 61 and the second motor 65 are driven based on the tilt angle as detected by the second tilt sensor 72 so that the tilt angle becomes 0°. Further, by continuing the driving of the first motor 61 and the second motor 65 until the first tilt sensor 71 detects the horizontal, the attitude can be detected with high accuracy. If a deviation occurs between values of the first encoder 62 and the second encoder 66 when the first tilt sensor 71 detects the horizontal, that is, between an actual tilt angle and the tilt angle as detected by the second tilt sensor 72, the tilt angle of the second tilt sensor 72 can be calibrated based on the deviation.

Therefore, by obtaining a relation between the detected tilt angle of the second tilt sensor 72 and the tilt angle which is obtained based on the horizontal detection by the first tilt sensor 71 and the detection result of the first encoder 62 and the second encoder 66 in advance, the tilt angle detected by the second tilt sensor 72 can be calibrated. Therefore, accuracy of the attitude detection with high responsiveness by the second tilt sensor 72 can be improved.

Further, when a fluctuation in a tilt is large and when a change in a tilt is rapid, the arithmetic processing unit 68 controls the first motor 61 and the second motor 65 based on a signal from the second tilt sensor 72. Further, when the fluctuation in the tilt is small and when the change in the tilt is slow, that is, in a condition where the first tilt sensor 71 is capable of following up, the arithmetic processing unit 68 controls the first motor 61 and the second motor 65 based on a signal from the first tilt sensor 71.

It is to be noted that the storage unit 73 is stored comparison data which is a data table showing a comparison result of a detection result of the first tilt sensor 71 and a detection result of the second tilt sensor 72. In a case where the arithmetic control unit 68 controls the first motor 61 and the second motor 65 based on the signal from the second tilt sensor 72, the arithmetic processing unit 68 calibrates a detection result obtained by the second tilt sensor 72 based on the comparison data. This calibration enables to improve the detection result obtained by the second tilt sensor 72 to a detection accuracy of the first tilt sensor 71. Thus, in an attitude detection by the attitude detector 19, the high responsiveness can be realized while maintaining the high accuracy.

By synthesizing the calculated rotation angle of the first encoder 62 and the calculated rotation angle of the second encoder 66, a tilt angle and a tilting direction are calculated. The tilt angle and the tilting direction correspond to a tilt angle and a tilting direction of the laser scanner main unit 3 where the attitude detector 19 is attached with respect to the verticality (or the horizontality).

A description will be given below on an embodiment of the present invention using the laser scanner 1 as a laser scanner.

Figure 7:
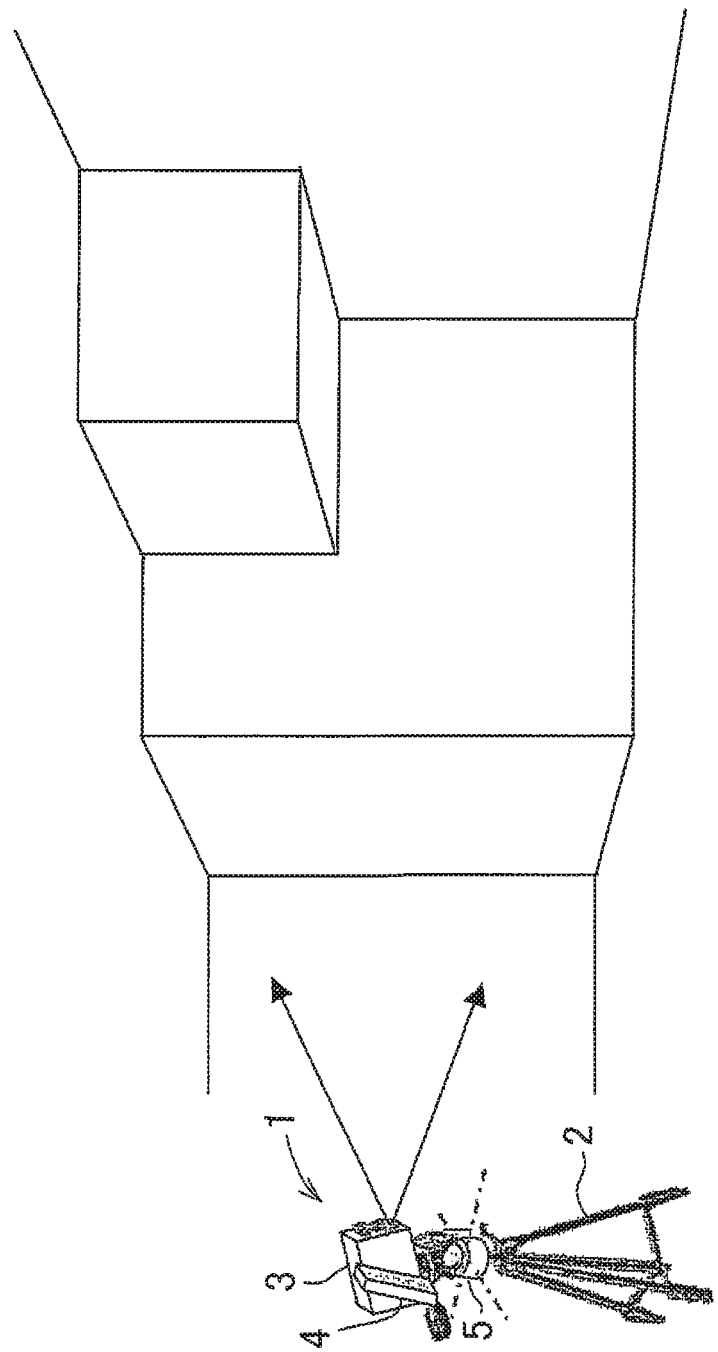
FIG. 7 is an explanatory drawing to show a measurement in a building in the present embodiment.

FIG. 7 is an explanatory drawing to show a state where an inside of a building is particularly measured. It is to be noted that a measurement may be performed in a state where the operation device 4 is attached to the laser scanner main unit 3, or the operation device 4 may be removed and remotely controlled.

The laser scanner 1 is installed at an indoor arbitrary position, and the laser scanner 1 is directed toward a measuring direction. A measurement range is photographed by the image pickup device 27.

An attitude (a tilt and a tilting direction) of the laser scanner 1 is detected by the attitude detector 19. A distance measurement result can be corrected based on a detection result of the attitude detector 19. Therefore, in the present embodiment, a leveling of the laser scanner 1 need not be performed.

It is to be noted that the attitude detector is not limited to the attitude detector 19 as described above, and an attitude detector which detects the horizontality or the verticality of the laser scanner 1 can suffice.

Figure 8:
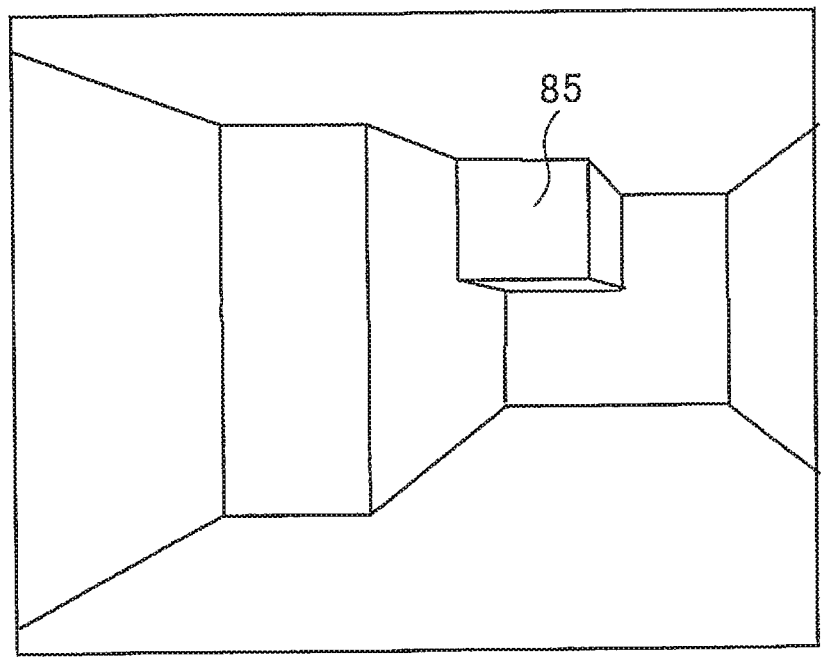
FIG. 8 is a drawing to show an image of an object to be measured acquired by an image pickup device of the laser scanner.

FIG. 8 shows an indoor image photographed by the image pickup device 27. A range of the image is equal to or wider than the measurement range.

The distance measuring light is projected from the distance measuring light projecting unit 21, the motors 47a and 47b are driven and controlled, and rotations of the optical prisms 41a and 41b are individually controlled. By individually controlling the optical prisms 41a and 41b, the distance measuring light can be scanned with an arbitrary pattern (see FIG. 4A to FIG. 4C).

Figure 9:
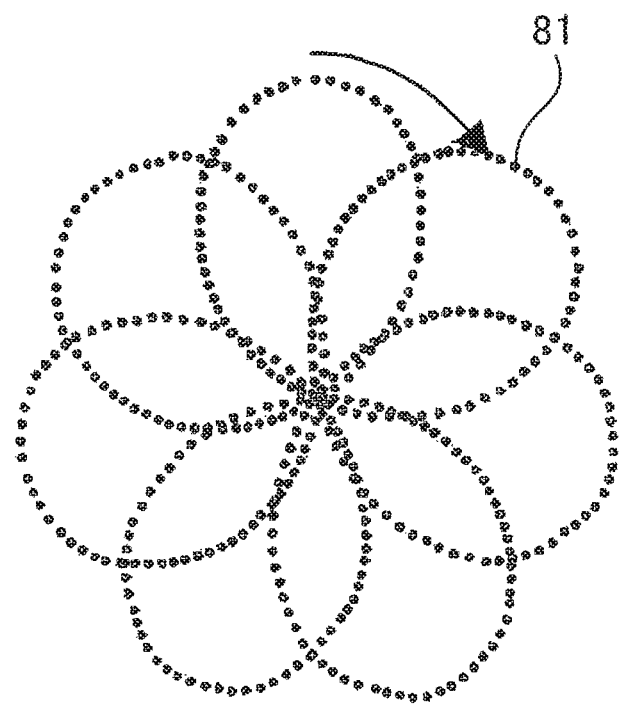
FIG. 9 is a drawing to show one example of a scanning pattern by the laser scanner.

FIG. 9 shows a petal-shaped scanning pattern 81 as one mode of a scanning pattern.

The scanning pattern 81 is obtained by rotating one optical prism 41a for 25 times and rotating the other optical prism 41b in a reverse direction for five times, for instance. In case of the scanning pattern 81, the 25 rotations/5 reverse rotations form is one pattern cycle. Further, by carrying out the measurement in a scanning process, point cloud data (scanning data) can be acquired along a scanning locus of the scanning pattern 81.

Figure 10:
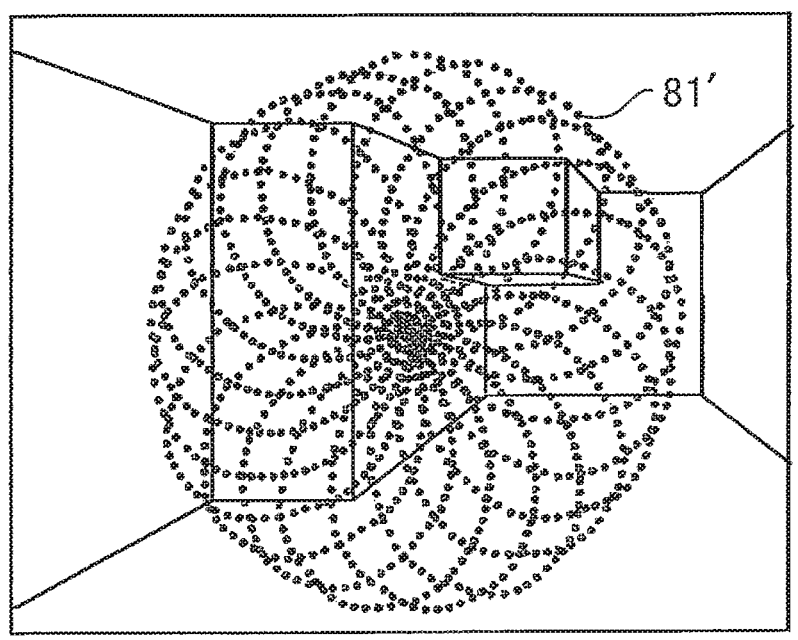
FIG. 10 is a drawing to show a relation between point cloud data in which a point cloud density is increased by the scanning pattern and an object to be measured.

Further, in a case where a density of the point cloud data is increased, by integrally rotating the optical prisms 41a and 41b at an angle as required per each pattern cycle and similarly scanning the scanning pattern 81, a scanning pattern 81' in which the density is increased can be obtained as shown in FIG. 10.

Further, FIG. 10 shows a state where the measurement with respect to the object to be measured is carried out by using the scanning pattern 81'. In the present embodiment, by a rotation of one axis, point cloud data with a two-dimensional expanse can be acquired.

Further, each point in the point cloud has distance measurement data and further has a direction angle based on the tilt angle detected by the attitude detector 19 and the projecting direction of the distance measuring light detected by the projecting direction detector 25, and three-dimensional data with reference to the verticality or the horizontality can be provided. That is, a measurement information of each point in the point cloud data can be converted into a horizontal distance and a height.

An image acquired by the image pickup device 27 includes a tilting of the image pickup device 27, the tilting of the image pickup device 27 is detected by the attitude detector 19, and a tilting of the image is corrected based on this detection result.

A building structure is formed with reference to the horizontality and the verticality, a wall is generally a vertical plane, and a ceiling and a floor are often a horizontal plane portion. Therefore, a cross line along which the walls cross each other and a ridge line of a pillar are considered as a vertical line (see FIG. 8). The control arithmetic unit 24 extracts vertical lines from the image. An extraction of the vertical lines is performed by a processing such as the edge filter for emphasizing a vertical component, the box filter for a vertical component, or the like.

It is to be noted that, in a case where there is a large tilting of the up and down direction in a photographing direction, the vertical lines do not appear in parallel in the image. In this case, the image may be converted into an orthographic image (a photographing direction is horizontal) by a projective transformation processing based on a vertical angle detected from the attitude detector 19, and the extraction processing of the vertical lines may be carried out.

Figure 11:
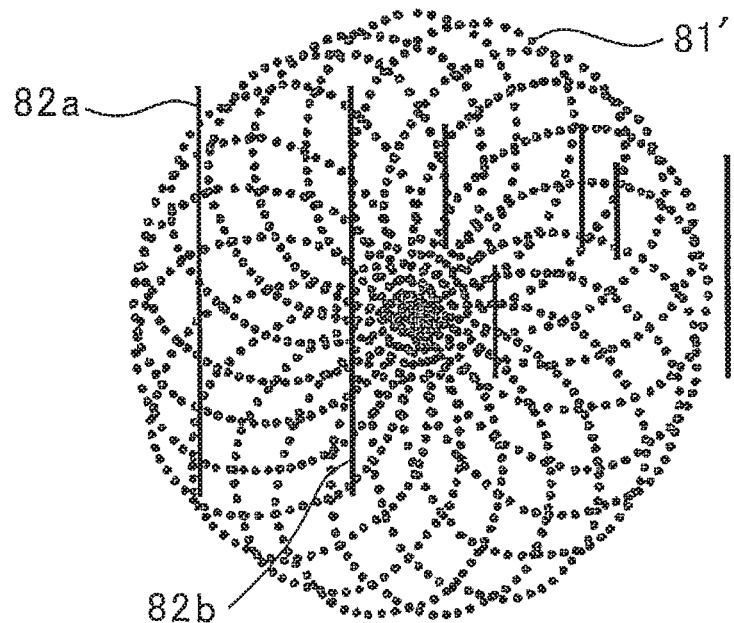
FIG. 11 is a drawing to show a relation between the point cloud data and vertical lines extracted from an acquired image.

FIG. 11 shows a state where the vertical lines 82 are extracted from the image and shows a relation between the vertical lines 82 and the scanning pattern 81'.

As described above, since a wall of a building is generally a vertical plane, it can be recognized that the vertical lines 82a and 82b belong to the same vertical plane.

Figure 12:
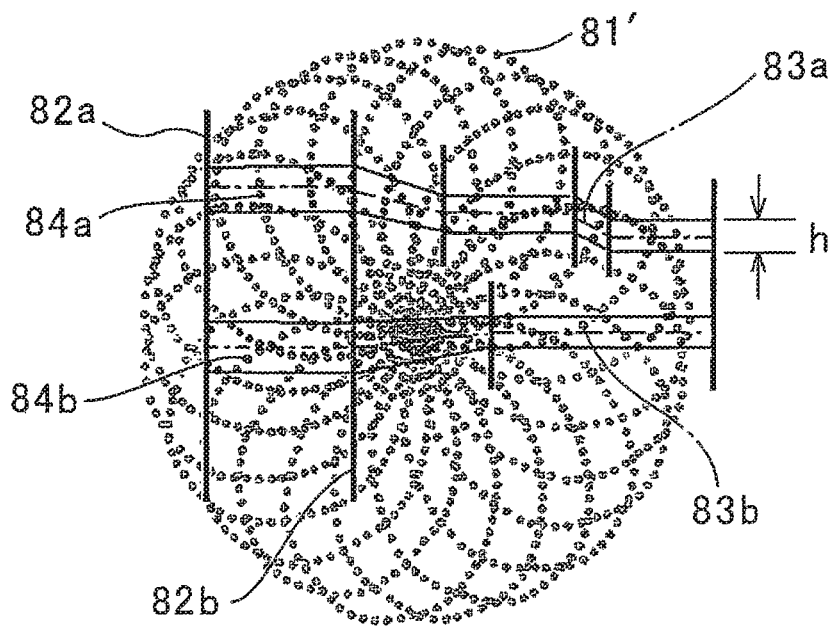
FIG. 12 is an explanatory drawing in which a range where horizontal distances are measured is selected from the point cloud data.

As shown in FIG. 12, height positions of height lines 83a and 83b of two upper and lower are set. In a case where a building is cut along a horizontal plane at each set height position, each of the height lines 83a and 83b is the same as a horizontal line formed at a position where the horizontal plane crosses a wall surface, and the horizontal line is nothing but a visible outline which appears on a horizontal cross section.

Band-like point cloud data 84a or 84b is selected in an arbitrary height width "h" around each of the height lines 83a and 83b of two upper and lower as the center. Vertical lines which vertically go across each band-like point cloud data 84a and 84b are assumed. Point data on the vertical line have the same horizontal distance.

Therefore, by averaging a distance information as acquired, a measurement accuracy of the horizontal distance is improved.

It is to be noted that positions of the height lines 83a and 83b to be set are selected from the image acquired by the image pickup device 27. For instance, as shown in FIG. 8, in a case where there is a hanging shelf 85 on a part of the ceiling, the height line 83a at an upper position is set at a position where the height line 83a passes through the hanging shelf 85, and the height line 83b at a lower position is set at a position where the height line 83b is deviated from the hanging shelf 85.

Therefore, by setting the height lines 83a and 83b appropriately according to an interior shape, the horizontal distance can be correctly measured even if the interior has a complicated shape.

Figure 13A:
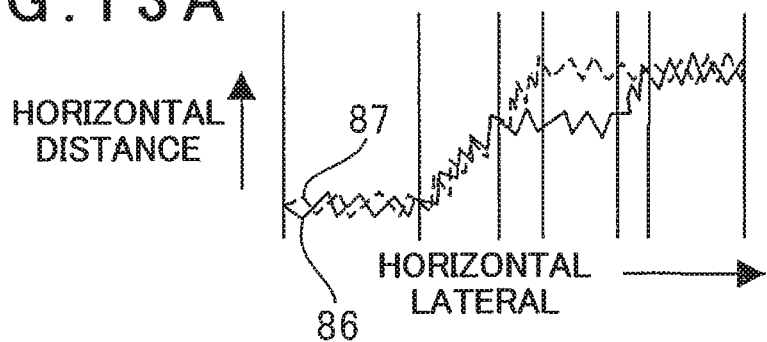
FIG. 13A is a drawing in which the horizontal distances measured from a selected range are developed in a horizontal direction.

FIG. 13A shows a drawing in which horizontal distance data of the band-like point cloud data 84a and 84b regarding the height lines 83a and 83b selected in FIG. 12 is added and averaged in a height direction and developed in the horizontal direction. In FIG. 13A, a solid line 86 shows a horizontal distance regarding the height line 83*a* at the upper position, and a broken line 87 shows a horizontal distance regarding the height line 83*b* at the lower position.

Figure 13B:
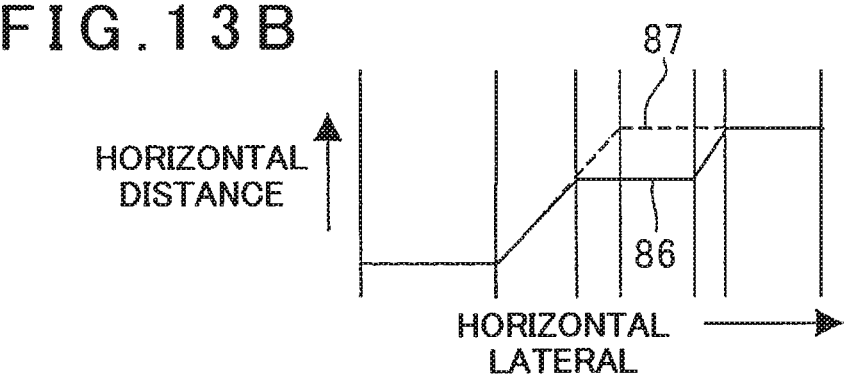
FIG. 13B is a drawing to show a straight line acquired by a straight line fitting to the measured horizontal distances by a least-squares method.

FIG. 13B shows linear changes of the horizontal distance provided by a straight line fitting to a portion between the vertical lines by a least-squares method. The straight lines as fitted are obtained in a process of applying the least-squares method. It is to be noted that, in a process of an averaging or a straight line fitting, an elimination of a maximum value and a minimum value or a data elimination by referring to a dispersion value may be used.

The averaging of the horizontal distances in the height direction and an average effect of the straight line fitting enable a measurement with high accuracy by a small number of point cloud data. Further, a drawing information using the straight lines can be acquired.

The straight line as described above obtained by the straight line fitting is nothing but a visible outline in a case where a building is cut along a horizontal plane including the height lines 83*a* and 83*b*.

Therefore, by setting the height lines 83*a* and 83*b* and the height width "h" of the band-like point cloud data 84*a* and 84*b* are set per each region sectioned by the vertical lines, data according to a distance can be acquired, a horizontal cross section matched with a structure of a building can be measured, and a horizontal cross-sectional view can be prepared.

Figure 14:
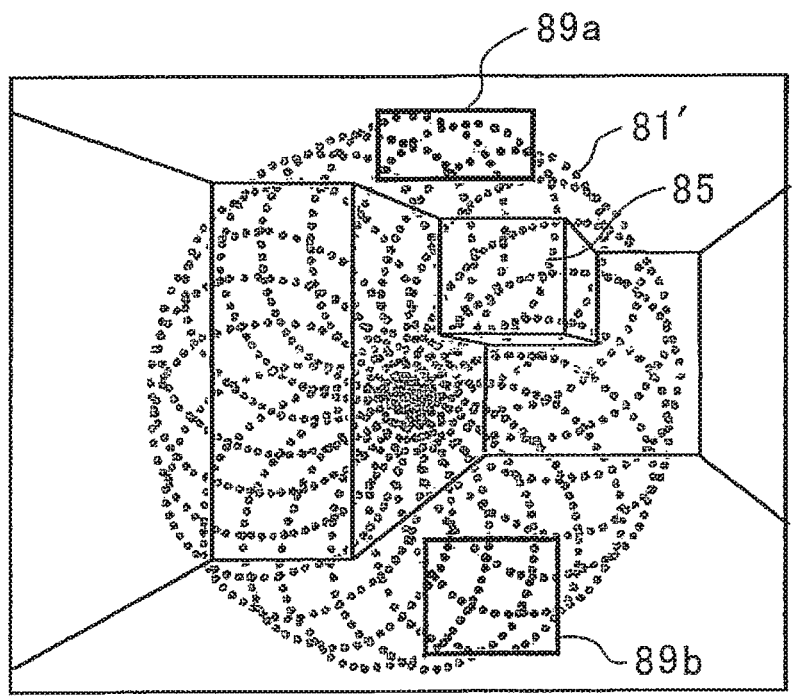
FIG. 14 is a drawing to explain a measurement range as set in order to measure a horizontal plane.

FIG. 14 shows an example in which a measurement region for the averaging processing at a time of measuring a height of a horizontal portion such as a ceiling, a floor, or the like is selected.

In the image acquired by the image pickup device 27, measurement regions 89*a* and 89*b* are set with respect to planes which can be recognized as horizontal planes, and heights of the point cloud data belonging to these regions are measured. Since the heights are the same because of the horizontal plane, by averaging height data of the point cloud data, the heights of the ceiling and the floor can be measured with high accuracy. It is to be noted that settings of the horizontal portions such as the ceiling, the floor, and the like may be specified in the image as acquired, or an upper region of the vertical lines extracted from the image may be recognized as the ceiling and a lower region of the vertical lines extracted from the image may be recognized as the floor.

Further, in a case where the measurement range is beyond a scanning range of the laser scanner 1 or a shade is created from one direction, an installation position of the laser scanner 1 may be changed, point cloud data may be acquired from a plurality of points, and the point cloud data as acquired may be synthesized.

Figure 15:
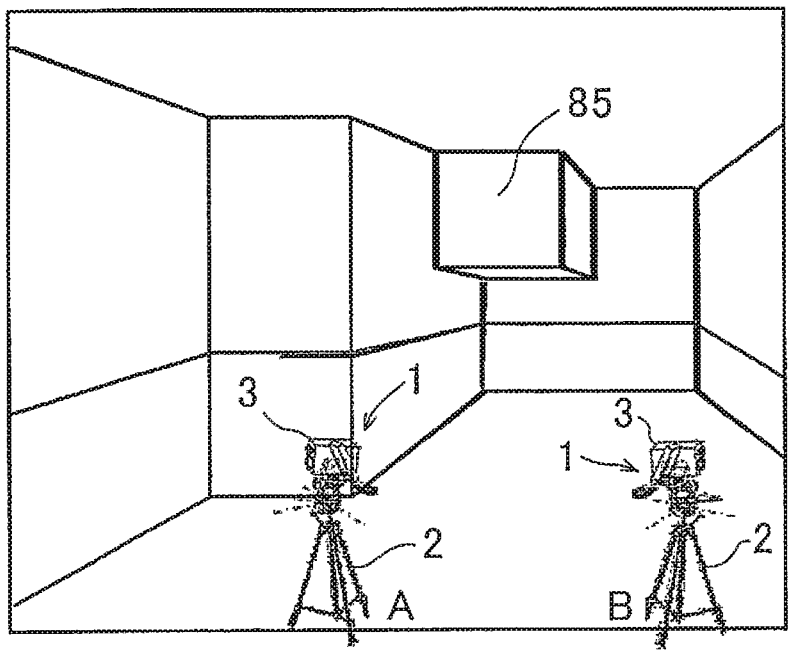
FIG. 15 is an explanatory drawing in which the laser scanner is installed at a plurality of points and the point cloud data is acquired.

FIG. 15 shows in a case where the laser scanner 1 is sequentially installed at two points (a point A and a point B) and point cloud data are acquired from the two points. In a case where the laser scanner 1 is installed at the plurality of points, the installation points are set so that an overlapping portion is produced among the point cloud data.

Figure 16:
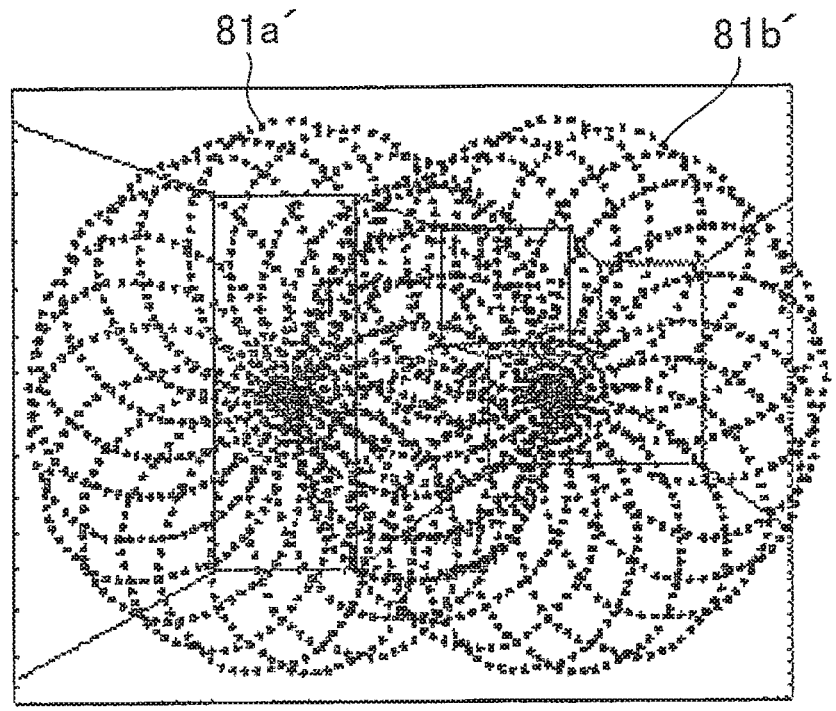
FIG. 16 is an explanatory drawing of the point cloud data acquired at the plurality of points.

FIG. 16 shows the point cloud data 81*a*' and 81*b*' acquired from the two points, and the point cloud data 81*a*' acquired by the laser scanner 1 installed at the point A and the point cloud data 81*b*' acquired by the laser scanner 1 installed at the point B overlap in a predetermined range.

Figure 17:
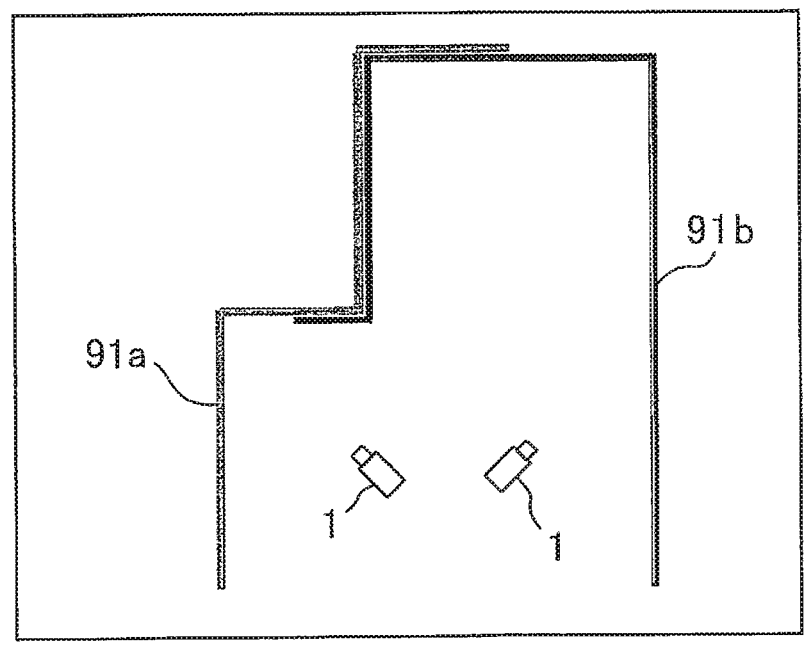
FIG. 17 is an explanatory drawing in which a visible outline of a partial horizontal cross section is prepared from each of the point cloud data acquired at the plurality of points and the plurality of point cloud data are matched with each other based on the visible outline.

The same processing as described above is performed based on the point cloud data 81*a*' and 81*b*', and the partial horizontal cross sections corresponding to each of the point cloud data are measured. Further, partial horizontal cross-sectional views are prepared. FIG. 17 shows visible outlines 91*a* and 91*b* in interior horizontal cross sections as acquired.

In a case where the point cloud data 81*a*' and 81*b*' are matched with each other, a matching is performed by overlapping each of the partial horizontal cross-sectional views. Specifically, the visible outlines 91*a* and 91*b* obtained in the partial horizontal cross-sectional views are matched. By matching the visible outlines 91*a* and 91*b*, the matching in the horizontal planes (a two-dimensional matching in the horizontal plane) is completed.

Next, regarding the height direction, by measuring a height of a floor surface at each of the installation positions as shown in FIG. 14, an instrument height of the laser scanner 1 at each of the installation positions can be measured.

Based on the instrument height, if the point cloud data 81*a* and 81*b* are matched in the height direction, the point cloud data 81*a*' and 81*b*' can be three-dimensionally matched.

In the present embodiment, it is not necessary to extract a common point from the plurality of point cloud data and match the plurality of point cloud data, and the matching can be extremely easily performed.

In the embodiment as described above, although the description has been given on the laser scanner 1 which independently rotates two prisms arranged concentrically and performs a laser scanning, it would suffice if the laser scanner 1 can scan a range as required.

It is to be noted that although the description has been given on the measurement in a building, an outer wall of a building with many vertical planes can be measured from an outside of a building by the same method. It is to be noted, in a process of acquiring horizontal distance data with different positions in a height direction, in a case where a discrepancy limit range of the horizontal distance data is set and the horizontal distance data exceeds the discrepancy limit range, a vertical plane as assumed may be judged not to be vertical. Further, similarly, in a process of averaging height data of a horizontal plane portion such as a ceiling, a floor, and the like, a discrepancy limit range of the height data is set and the height data exceeds the discrepancy limit range, a horizontal plane as assumed may be judged not to be horizontal.

The invention claimed is:

1. A measuring method, wherein point cloud data of a building is acquired by a laser scanner, wherein said laser scanner has an attitude detector for detecting a tilting with respect to a horizontality or a verticality, converts said point cloud data into a horizontal distance and a height or a difference of a height based on the tilting detected by said attitude detector, sets a height line at a predetermined height on a wall surface, averages a horizontal distance information of said point cloud data included in a predetermined width with said height line as a center in a height direction, further develops said horizontal distance information along said height line in a horizontal direction, and measures a horizontal cross section at said predetermined height.

2. The measuring method according to claim 1, wherein said laser scanner has an image pickup device, acquires an image including said point cloud data by said image pickup device, extracts vertical lines of the building from an acquired image, sections a horizontal distance measurement value developed in the horizontal direction by said vertical lines, performs a straight line fitting to a change in said horizontal distance measurement value developed between said vertical lines, and acquires data of a straight line.

3. The measuring method according to claim 1, wherein a plurality of said height lines at different heights are set, and a plurality of horizontal cross sections at different heights are measured.

4. The measuring method according to claim 2, wherein a horizontal plane is recognized from said acquired image, a measurement region is set in said horizontal plane, heights of said point cloud data belonging to said measurement region are averaged, and a height of said horizontal plane is measured.

5. The measuring method according to claim 1, wherein said point cloud data are acquired from a plurality of installation points so as to overlap each other, partial horizontal cross sections are measured respectively based on each of said point cloud data, the partial horizontal cross-sectional views acquired based on measurement results are overlapped and matched, and the partial horizontal cross sections are connected.

6. The measuring method according to claim 4, wherein said point cloud data are acquired from a plurality of installation points so as to overlap each other and the heights of said horizontal plane are measured from said each of said point cloud data regarding each of the installation points of the plurality of installation points, and the measured heights are matched in the height direction, and the partial horizontal cross sections are connected.

7. A laser scanner comprising a light emitting element for emitting a distance measuring light, a distance measuring light projecting unit for projecting said distance measuring light, a light receiving unit for receiving a reflected distance measuring light and a photodetector for receiving said reflected distance measuring light and producing a light receiving signal, and comprising a distance measuring unit for performing a distance measurement of an object to be measured based on said light receiving signal from said photodetector, a control unit for controlling a distance measuring operation, an optical axis deflecting unit provided on an optical axis of said distance measuring light projecting unit and an optical axis of said light receiving unit and for controlling a deflection of said optical axes, a projecting direction detector for detecting deflection angles of said optical axes and an attitude detector for detecting a horizontality or a verticality, wherein said control unit is configured to control said optical axis deflecting unit, to scan said distance measuring light in a predetermined range, to acquire point cloud data with a distance measurement information, said deflection angles detected by said projecting direction detector, and a horizontal distance and a height information based on a detection result of said attitude detector, to set a height line at a predetermined height on a wall surface, to add and average the horizontal distance information included in a predetermined width with said height line as a center in a height direction, further to develop said horizontal distance information along said height line in a horizontal direction, and to measure a horizontal cross section at said predetermined height.

8. The laser scanner according to claim 7, comprising an image pickup device, wherein an image including said point cloud data is acquired by said image pickup device, and wherein said control unit extracts vertical lines of a building from an acquired image, sections said horizontal distance information developed in the horizontal direction by said vertical lines, performs a straight line fitting to a change in said horizontal distance information developed between said vertical lines, and acquires data of a straight line.

9. The measuring method according to claim 2, wherein a plurality of said height lines at different heights are set, and a plurality of horizontal cross sections at different heights are measured.

10. The measuring method according to claim 2, wherein said point cloud data are acquired from a plurality of installation points so as to overlap each other, partial horizontal cross sections are measured respectively based on each of said point cloud data, the partial horizontal cross-sectional views acquired based on measurement results are overlapped and matched, and the partial horizontal cross sections are connected.

11. The measuring method according to claim 3, wherein said point cloud data are acquired from a plurality of installation points so as to overlap each other, partial horizontal cross sections are measured respectively based on each of said point cloud data, the partial horizontal cross-sectional views acquired based on measurement results are overlapped and matched, and the partial horizontal cross sections are connected.

12. The measuring method according to claim 4, wherein said point cloud data are acquired from a plurality of installation points so as to overlap each other, partial horizontal cross sections are measured respectively based on each of said point cloud data, the partial horizontal cross-sectional views acquired based on measurement results are overlapped and matched, and the partial horizontal cross sections are connected.

13. The measuring method according to claim 9, wherein said point cloud data are acquired from a plurality of installation points so as to overlap each other, partial horizontal cross sections are measured respectively based on each of said point cloud data, the partial horizontal cross-sectional views acquired based on measurement results are overlapped and matched, and the partial horizontal cross sections are connected.

* * * * *